(No Model.)
L. ATWOOD.
TROLLEY OR CONTACT SUPPORT FOR ELECTRIC CARS.
No. 435,166. Patented Aug. 26, 1890.
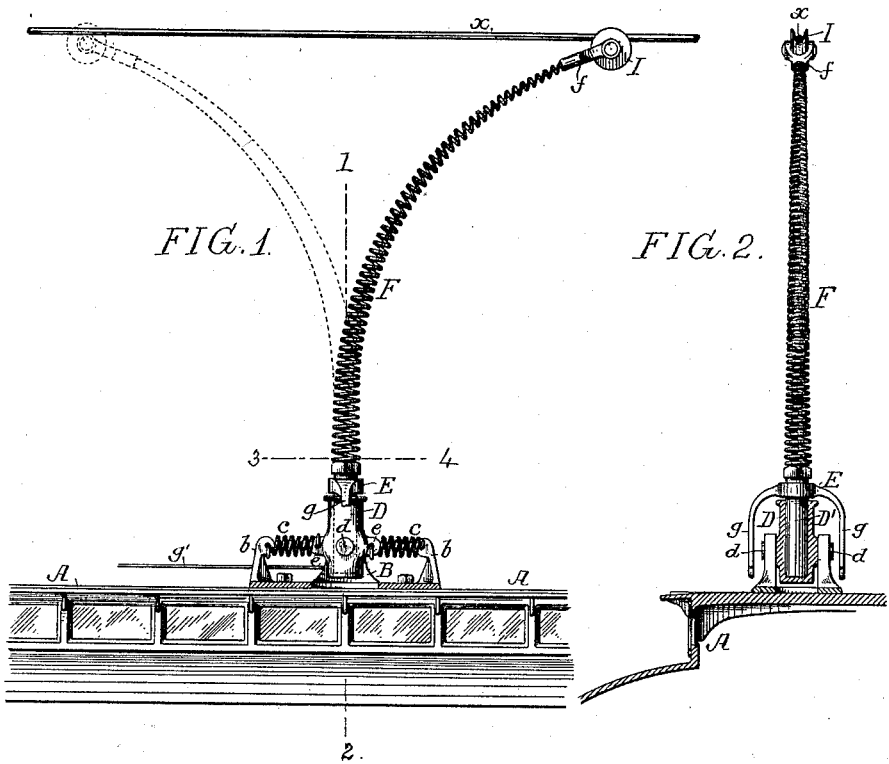
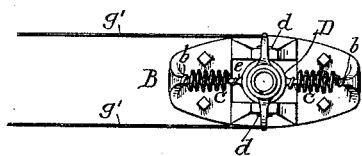
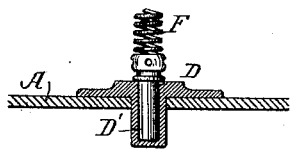
Witnesses:
Murray C. Boyer.
A. V. Groupe.
Inventor:
Leonard Atwood
by his Attorneys
Howson & Howson

UNITED STATES PATENT OFFICE.

LEONARD ATWOOD, OF PHILADELPHIA, PENNSYLVANIA.

TROLLEY OR CONTACT-SUPPORT FOR ELECTRIC CARS.

SPECIFICATION forming part of Letters Patent No. 435,166, dated August 26, 1890.

Application filed June 9, 1890. Serial No. 354,716. (No model.)

*To all whom it may concern:*

Be it known that I, LEONARD ATWOOD, a citizen of the United States, and a resident of Philadelphia, Pennsylvania, have invented certain Improvements in Trolleys or Contact-Supports for Electric-Railway Cars, of which the following is a specification.

The object of my invention is to provide a universal elastic support for an overhead contact of an electric-railway car. This object I attain in the following manner, reference being had to the accompanying drawings, in which—

Figure 1 is a side view of sufficient of a car to illustrate my invention, showing a trolley in contact with the overhead wire. Fig. 2 is a sectional view on the line 1 2, Fig. 1. Fig. 3 is a sectional plan view on the line 3 4, Fig. 1; and Fig. 4 is a view showing a modification of my invention.

A is the body of the car, on which is mounted the supporting-frame B, having bearings for the trunnions $b$ of the socket D. In this socket is mounted a spindle D', carrying the tapered coiled-spring arm F, which extends from the car to the trolley-wire $x$, and has at its upper end a bearing $f$ for the trolley I. It will be understood that other forms of contacts may be used without departing from my invention. I prefer to taper this coiled spring as shown, and where circumstances permit I also taper the wire before it is formed into a spring, so that it will yield evenly throughout its entire length.

E is a sleeve secured to the spindle D'. This sleeve has two arms $g$ $g$, which pass down at each side of the bearings on the plate B, and to these arms $g$ $g$ are attached ropes or wires $g'$, which extend to a point in easy reach of the motor-man. By drawing upon one or other of the cords or wires the trolley-arm can be turned. This is especially important when the car is traveling around a switch.

The above-described mechanism is universal. It will follow the line of the wire, and the trolley-arm can be turned to the position shown by dotted lines in Fig. 1, and the mechanism will work in the same manner, as before remarked.

Secured to lugs $e$ $e$ at the front and rear of the socket D are springs $c$ $c$, the opposite ends of these springs being secured to brackets $b$ $b$ on the base-plate B. These springs are tension-springs, and if the socket is turned on its trunnions the pull will be even on both springs, no matter in what direction the pull is made, either forward or backward, the springs returning the socket to a vertical position.

It will be understood that in some cases the spring arrangement may be omitted—for instance, as shown in Fig. 4, in which the socket and face-plate are in one piece. The spindle D' passes into the socket, which in the present instance extends into the roof of the car. The turning arms $g$ $g$ may also be dispensed with in some instances, and the spring-supporter F may be secured directly to the base-plate. The wire from the contact or trolley may pass down through the coiled spring to the proper contact-plate on the car. It will be seen that a very simple supporting-arm is obtained, dispensing with all outside means usually employed for giving the elasticity required. The supporter will accommodate itself to the wire whether the track and wire are on the same line or not.

I claim as my invention—

1. A contact-supporting arm made from coiled wire extending from the car to the contact, substantially as described.

2. The combination of the contact base-plate on the car with an intervening trolley-support consisting of a tapered coiled spring, substantially as described.

3. A contact-supporting arm consisting of a tapered coiled spring made from a tapered wire, substantially as described.

4. The combination of the base mounted on the car, the contact with an arm elastic throughout its entire length made of a coiled spring with a socket, and a spindle on the arm adapted to the socket, substantially as described.

5. The combination of the base, the socket having trunnions adapted to said base, brackets on the base, tension-springs extending from the front and back of the socket to the brackets, and a contact-supporting arm, substantially as described.

6. The combination of the socket, spindle adapted to said socket, having arms $g\,g$, cords extending to the front portion of the car from the arms $g\,g$, and the contact-supporting arm, substantially as described.

In testimony whereof I have signed my name to this specification in the presence of two subscribing witnesses.

LEONARD ATWOOD.

Witnesses:
HENRY HOWSON,
EUGENE ELTERICH.